(12) United States Patent
Chang et al.

(10) Patent No.: US 7,241,110 B2
(45) Date of Patent: Jul. 10, 2007

(54) CENTRIFUGAL FAN WITH STATOR BLADES

(75) Inventors: Shun-Chen Chang, Taoyuan Hsien (TW); Kuo-Cheng Lin, Taoyuan Hsien (TW); Wen-Shi Huang, Taoyuan Hsien (TW)

(73) Assignee: Delta Electronics, Inc., Taoyuan Sien (TW)

( * ) Notice: Subject to any disclaimer, the term of this patent is extended or adjusted under 35 U.S.C. 154(b) by 104 days.

(21) Appl. No.: 10/848,074

(22) Filed: May 19, 2004

(65) Prior Publication Data
US 2005/0095125 A1 May 5, 2005

(30) Foreign Application Priority Data
Oct. 31, 2003 (TW) .............................. 92130427 A

(51) Int. Cl.
*F04D 29/44* (2006.01)
(52) U.S. Cl. .................. 415/184; 415/199.6; 415/206; 415/211.2; 416/198 R
(58) Field of Classification Search ............. 415/199.6, 415/184, 204, 206, 311.2, 211.2; 416/189, 416/198 R
See application file for complete search history.

(56) References Cited

U.S. PATENT DOCUMENTS

| 2,037,395 | A | * | 4/1936 | Seelig .................. 415/160 |
| 4,084,918 | A | * | 4/1978 | Pavlecka .................. 415/1 |
| 4,111,597 | A | * | 9/1978 | Grossi et al. ............... 415/143 |
| 5,025,629 | A | * | 6/1991 | Woollenweber ............. 415/160 |
| 5,286,164 | A | | 2/1994 | Goehre et al. |
| 6,179,561 | B1 | | 1/2001 | Horng |
| 6,386,839 | B1 | * | 5/2002 | Chuang .................. 415/199.6 |
| 6,540,479 | B2 | * | 4/2003 | Liao et al. ............... 415/199.5 |
| 6,589,013 | B2 | | 7/2003 | Abdallah |
| 6,663,342 | B2 | * | 12/2003 | Huang et al. ............ 415/199.5 |

FOREIGN PATENT DOCUMENTS

| DE | 41 15 805 A1 | 11/1992 |
| EP | 0 971 131 A2 | 1/2000 |

* cited by examiner

Primary Examiner—Igor Kershteyn
(74) Attorney, Agent, or Firm—Birch, Stewart, Kolasch & Birch, LLP

(57) ABSTRACT

A centrifugal fan with stator blades. The centrifugal fan includes a first frame, a second frame, a driving device, and a blade structure with a first portion and a second portion. The second frame includes a plurality of stator blades thereon. The first portion is coupled with the driving device, and includes a plurality of first rotor blades thereon. The second portion is combined with the first portion and includes a plurality of second rotor blades thereon. The stator blades are located between the first rotor blades and the second rotor blades respectively.

21 Claims, 6 Drawing Sheets

CENTRIFUGAL FAN WITH STATOR BLADES

This Non-provisional application claims priority under 35 U.S.C. § 119(a) on Patent Application No(s). 092130427 filed in Taiwan on Oct. 31, 2003, the entire contents of which are hereby incorporated by reference.

BACKGROUND OF THE INVENTION

1. Field of the Invention

The invention relates to a heat-dissipating device; and in particular, the invention relates to a centrifugal fan including a frame assembly with stator blades.

2. Description of the Related Art

FIG. 1 shows a conventional centrifugal fan (blower) 1. The centrifugal fan 1 includes an outer frame 10, a motor 20, and a blade structure 30. The outer frame 10 includes an air inlet 11 and an air outlet (not shown) The motor 20 is disposed on a base 101 of the outer frame 10 to drive the blade structure 30. The blade structure 30 includes a hub 31, a base plate 32, and a plurality of rotor blades 33 formed on the base plate 32. However, the rotor blades will drive the airflow to generate vortex such that the heat-dissipation efficiency of the fan will be reduced. Moreover, the large gaps formed between two adjacent blades 33 make airflow difficult to control. Thus, reflow is easily generated, and the heat-dissipation efficiency still suffers.

To overcome the above-described disadvantages, new electronic device designs increase the blade numbers or sizes or enlarge the inner space in the outer frame of the centrifugal fan to increase airflow and heat-dissipation. Such designs, however, are not well-suited for small devices or are not allowable in the limited space. Additionally, uneven-airflow, noise, and reduced-airflow are easily generated by such designs.

SUMMARY OF THE INVENTION

In view of this, the invention provides a centrifugal fan with at least one set of rotor blades and stator blades to increase air pressure.

Another purpose of the invention is to provide a frame assembly for a centrifugal fan, which includes at least one set of stator blades to guide airflow.

Accordingly, the invention provides a centrifugal fan including a frame assembly and a blade structure. The frame assembly includes a plurality of stator blades. The blade structure is disposed in the frame assembly, and includes a plurality of first rotor blades and a plurality of second rotor blades.

In a preferred embodiment, the frame assembly includes an air inlet, an air outlet, and an air-converging channel with an inlet therein. The first rotor blades are located near the air inlet, and the second rotor blades are near the inlet of the air-converging channel. The blade structure includes a flange, extending toward the air-converging channel, near the inlet of the air-converging channel. The frame assembly is formed with a wall, extending toward the inlet of the air-converging channel, to separate the air-converging channel and a channel for air passing through the stator blades, the first rotor blades and the second rotor blades. The height of the air-converging channel and the height of the channel for air passing through the stator blades and the first and second rotor blades are partially or completely overlapped in an axial direction of the blade structure. A cross-sectional area of the air-converging channel is substantially equal to a cross-sectional area of the air outlet. Each of the first rotor blades includes an inclined surface near the air inlet.

In another preferred embodiment, the frame assembly comprises a first frame and a second frame. The blade structure is disposed on the first frame. The second frame is combined with the first frame, and the stator blades are formed on the second frame.

In yet another preferred embodiment, the blade structure comprises a first portion and a second portion. The first portion includes the first rotor blades. The second portion is combined with the first portion, and includes the second rotor blades and a flange.

In an aspect of the invention, a centrifugal fan is provided. The centrifugal fan comprises a first frame, a second frame, a driving device, and a blade structure with a first portion and a second portion. The second frame includes at least one set of stator blades, and the driving device is disposed on the first frame. The first portion is combined with the driving device, and includes a plurality of first rotor blades. The second portion is combined with the first portion, and includes a plurality of second rotor blades. The stator blades are located between the first rotor blades and the second rotor blades.

In another aspect of the invention, a centrifugal fan is provided. The centrifugal fan comprises a frame and a blade structure. The frame includes a plurality of stator blades and an air-converging channel with an inlet. The blade structure is disposed in the frame, and includes a flange and a plurality of rotor blades. The flange extends toward the air-converging channel and is located near the inlet.

In yet another aspect of the invention, a centrifugal fan is provided. The centrifugal fan comprises a frame and a blade structure. The frame includes a plurality of stator blades, a first channel for gathering airflow, and a second channel for air passing through. The blade structure is disposed in the frame, and includes a plurality of rotor blades. The height of the first channel and the height of the second channel are partially or completely overlapped in an axial direction of the blade structure.

In still another aspect of the invention, a heat-dissipating device is provided. The heat-dissipating device comprises a frame structure and a blade structure. The frame structure includes at least one set of stator blades. The blade structure is disposed in the frame structure, and includes at least one set of rotor blades. The stator blades and the rotor blades are arranged in a staggered way.

Furthermore, the at least one set of stator blades are disposed on an air inlet of the frame structure or an air outlet of the frame structure.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the subsequent detailed description and the accompanying drawings, which are given by way of illustration only, and thus are not limitative of the present invention, and wherein:

FIG. 2b is a perspective view of the assembled centrifugal fan of FIG. 2a;

FIG. 3a is a cross-sectional view of the centrifugal fan of FIG. 2b along a line 3a—3a;

DETAILED DESCRIPTION OF THE INVENTION

Figure 1:
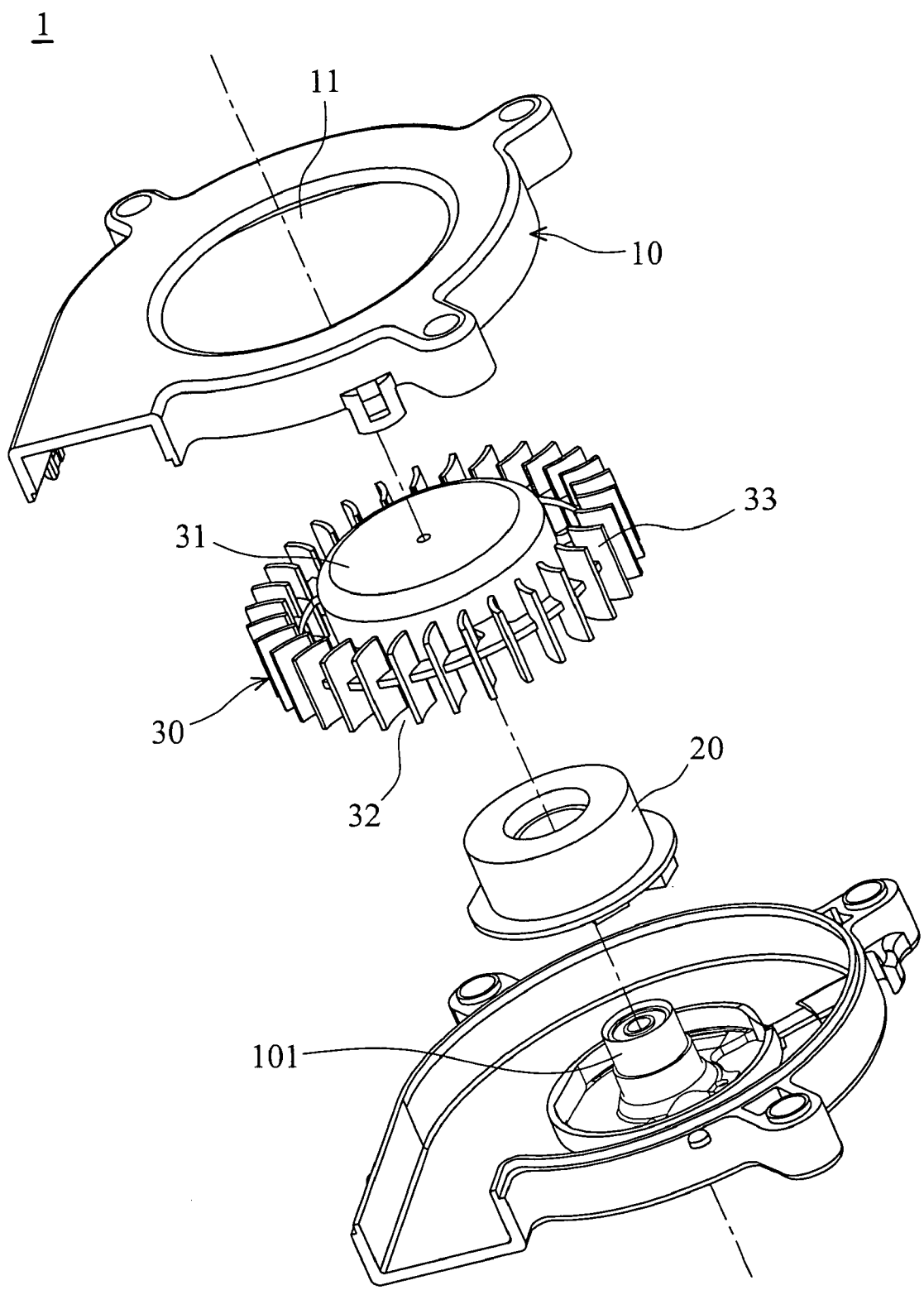
FIG. 1 is an exploded view of a conventional centrifugal fan.

FIGS. 2a–3b show a centrifugal fan 2 as disclosed in the invention. The centrifugal fan 2 includes a frame assembly 100, a blade structure 200, and a driving device 300. Since the driving device 300 is the same as the conventional motor, its detailed description is omitted.

The frame assembly 100 includes a first frame 110, a second frame 120, and a plurality of stator blades 130. The first frame 110 serves as a base of the centrifugal fan 2. The driving device 300 is disposed on a bearing tube 111 of the first frame 110, and combined with the blade structure 200. The second frame 120 serves as an upper cover and is combined with the first frame 110. The stator blades 130 are formed on the second frame 120 to guide airflow in the centrifugal fan 2, thus increasing air pressure.

Figure 2A:
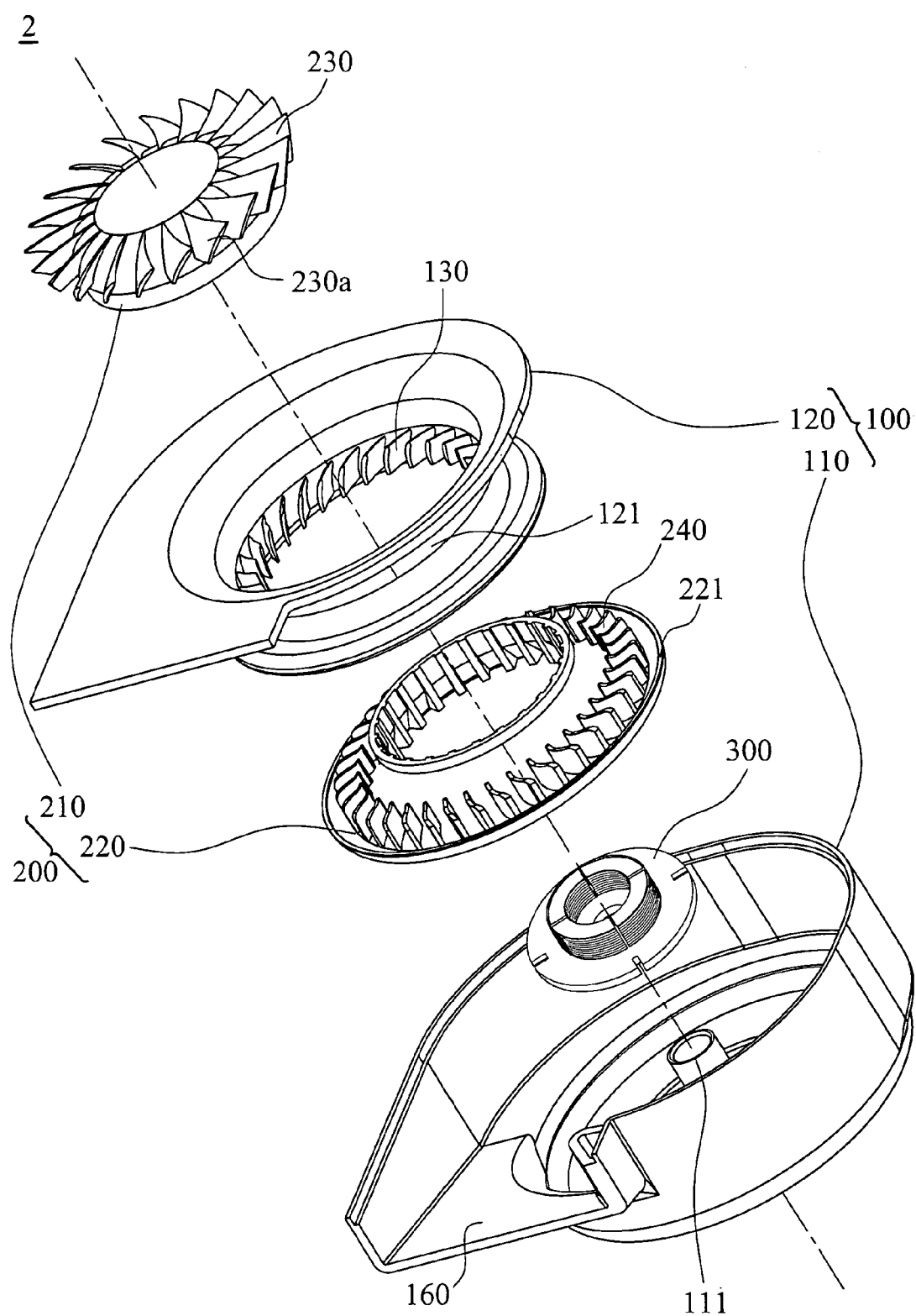
FIG. 2a is an exploded view of a centrifugal fan as disclosed in the invention.
Figure 2B:
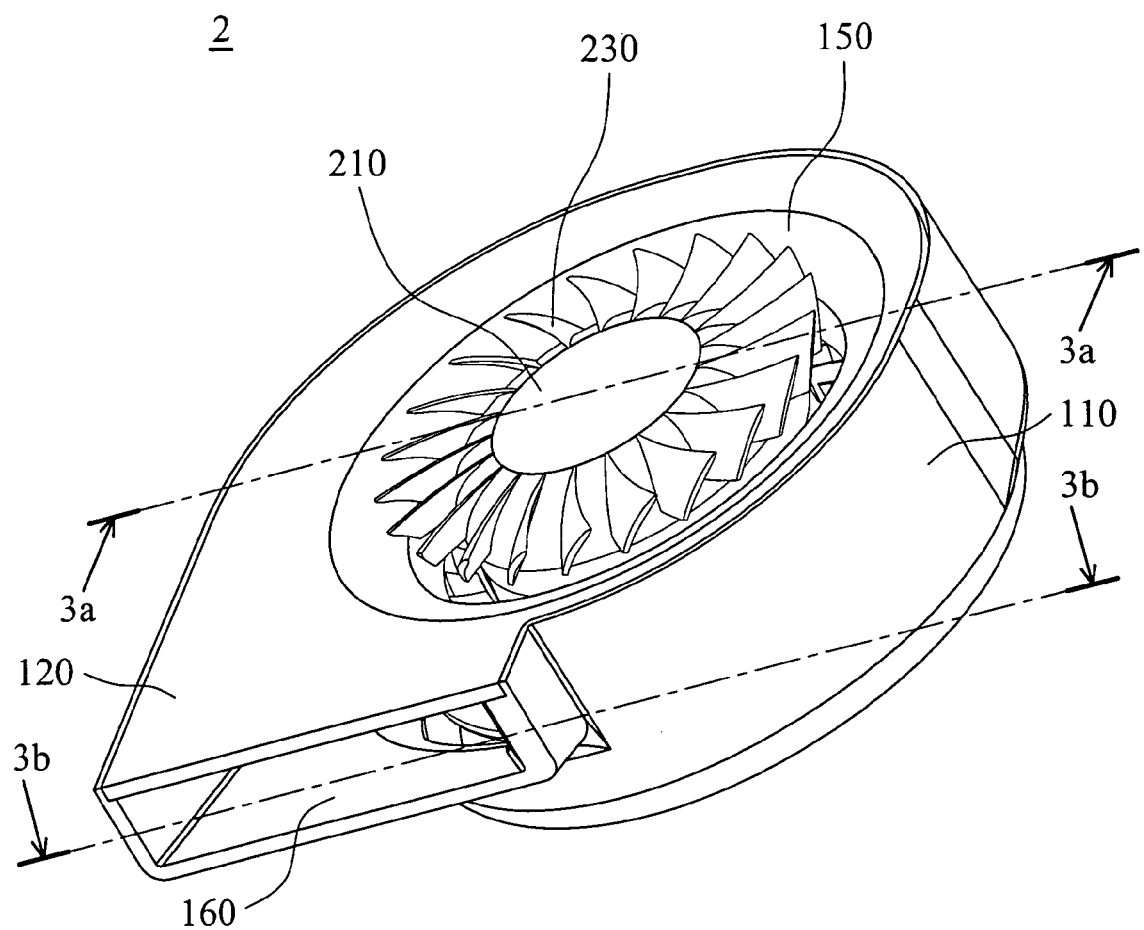
Figure 3A:
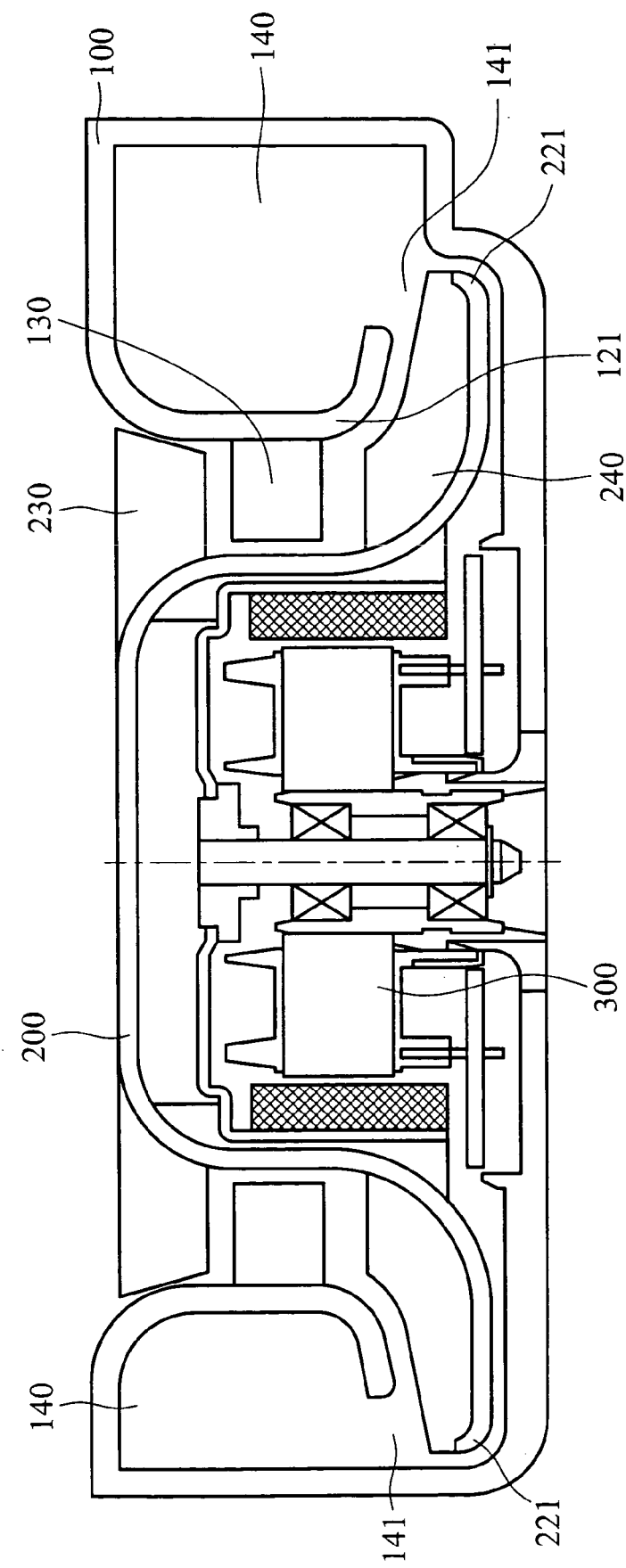
Figure 3B:
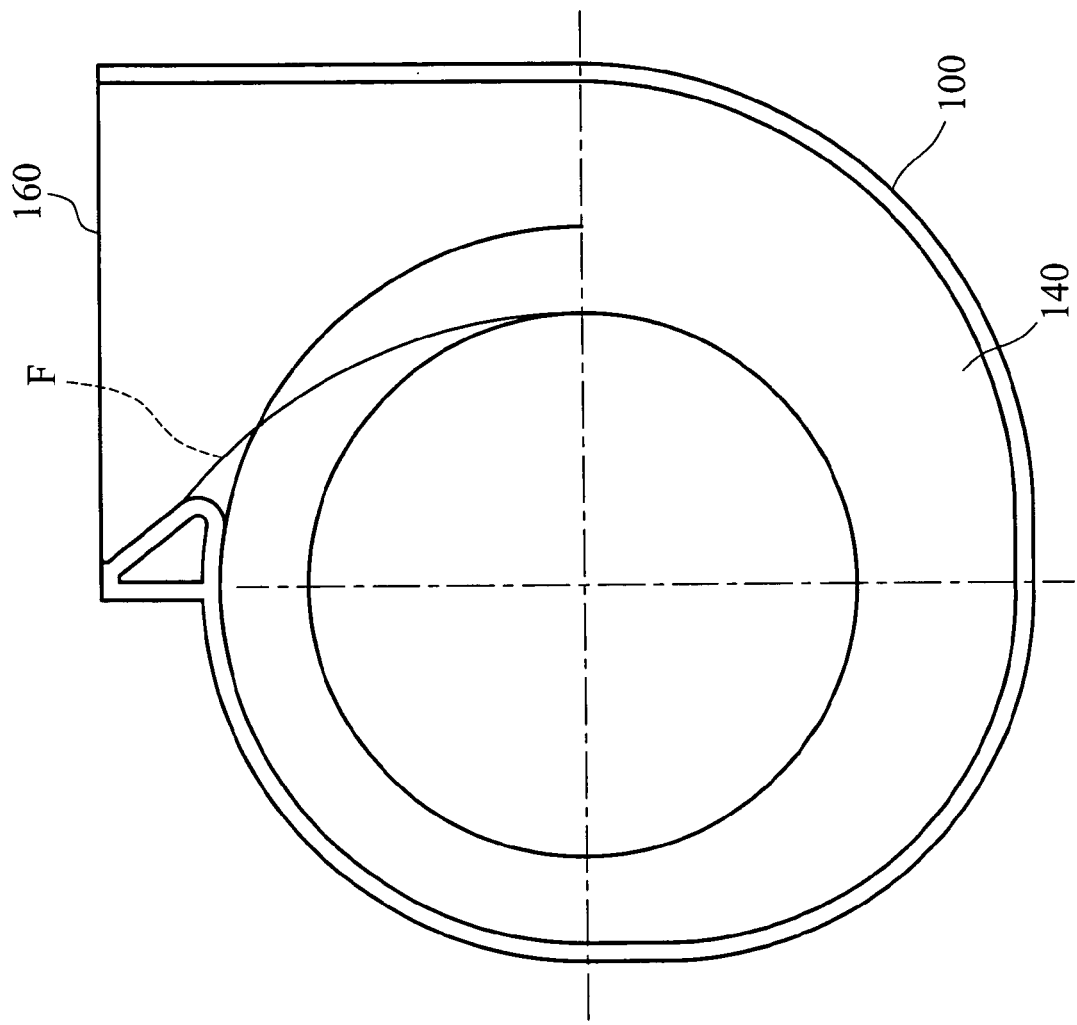
FIG. 3b is a cross-sectional view of the centrifugal fan of FIG. 2b along a line 3b—3b.

As shown in FIG. 2b, the frame assembly 100 includes an air inlet 150 and an air outlet 160. As shown in FIG. 3a, the frame assembly 100 includes an air-converging channel between the first frame 110 and the second frame 120. The air-converging channel 140 is used as a tank for storing air, and is hereinafter referred to as a first channel. Referring to FIG. 3b, the width of the first channel 140 is not uniform. Specifically, the first channel 140 becomes wider as it is closer to the air outlet 160. The width of the air outlet 160 is based on the first channel 140. As shown by an imaginary line F in FIG. 3b, the width of the air outlet 160 is formed by drawing a tangential line at a predetermined position of the inner circumference of the first channel 140. As a result, the air pressure in the first channel 140 becomes more even, thus enhancing heat-dissipation of the centrifugal fan 2.

It is understood that a cross-sectional area of the first channel 140 is substantially equal to a cross-sectional area of the air outlet 160. Thus, the work done by the airflow can be maintained at a predetermined level due to uniformity of the cross-sectional area.

The blade structure 200 is disposed in the frame assembly 100, and includes a first portion 210, a second portion 220, a plurality of first rotor blades 230, and a plurality of second rotor blades 240. The first rotor blades 230 are disposed on the first portion 210. The second portion 220 can be coupled with the first portion 210, and includes the second rotor blades 240 and a flange 221 formed thereon. The flange 221 extends upward toward the first channel 140 for guiding the airflow upward to the first channel 140 so that the airflow is output from the air outlet 160.

In the figures, the second portion 220 can be combined with the first portion 210 by engagement; however, they may be joined in another method, such as welding or adhesion. Additionally, in FIG. 3a, the boundary line between the second portion 220 and the first portion 210, and the boundary line between the second frame 120 and the first frame 110 are omitted.

The first rotor blades 230 are located in the vicinity of the air inlet 150. Each of the first rotor blades 230 includes an inclined surface 230a at a side near the inner wall of the air inlet 150, thus increasing the work area of the air inlet 150. As shown in FIG. 3a, the second rotor blades 240 are located in the vicinity of the inlet 141 of the air-converging channel 140. The stator blades 130 are located between the first rotor blades 230 and the second rotor blades 240.

Referring to FIG. 2a and FIG. 3a, the second frame 120 of the frame assembly 100 is formed with a wall 121, extending toward the inlet 141 of the air-converging channel 140, to divide two air channels in the frame assembly 100. That is, the frame assembly 100 is formed with the first channel 140 serving as the air-converging channel, and a second channel (not labeled) serving as the channel for air passing through the stator blades 130, the first rotor blades 230, and the second rotor blades 240.

Since the second portion 220 includes the flange 221 extending upward, the airflow can be smoothly guided into the first channel 140. Thus, the height of the first channel 140 and the height of the second channel can be partially or completely overlapped in an axial direction of the blade structure 200. As a result, the entire centrifugal fan 2 can be minimized.

Figure 4:
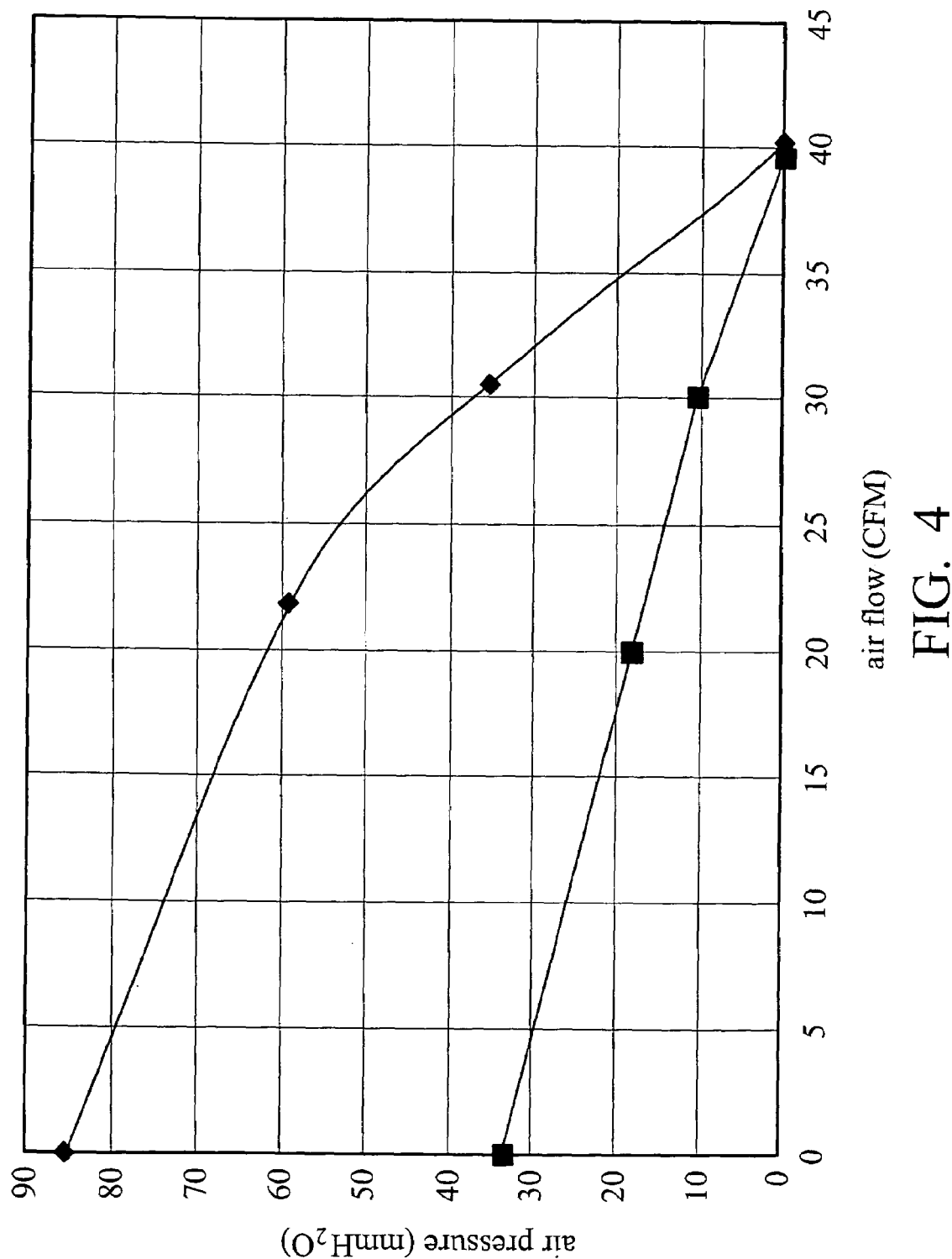
FIG. 4 is a pressure-airflow comparison graph of the conventional centrifugal fan and the centrifugal fan of the invention.

FIG. 4 is a pressure-airflow graph of the conventional centrifugal fan and the centrifugal fan of the invention. In FIG. 4, the X-axis represents airflow, the Y-axis represents air pressure, the solid line represents the centrifugal fan of the invention, and the dashed line represents the conventional centrifugal fan. As shown in FIG. 4, under the same airflow condition, the centrifugal fan of the invention can generate greater air pressure.

As stated above, the centrifugal fan of the invention additionally includes one set of stator blades and one set of rotor blades above the original blades, thus increasing the air pressure.

Although in the embodiment the centrifugal fan simply adds one set of stator blades and one set of rotor blades, more than one set of rotor blades or stator blades can be added based on requirements. For example, in a centrifugal fan with two air inlets, two sets of stator blades are provided; that is, one set of stator blades is formed in the vicinity of one air inlet, and the other set of stator blades is formed in the vicinity of the other air inlet. Additionally, in the blade structure of the centrifugal fan, three sets of rotor blades can be provided; that is, a plurality of third blades can be added. Furthermore, the stator blades and the rotor blades are arranged in a staggered way.

Since the centrifugal fan of the invention includes at least one set of rotor blades or stator blades, the airflow can be smoothly guided by the stator blades on the frame assembly to avoid vortex. Thus, the air pressure can be increased, and the heat-dissipation can be enhanced.

While the invention has been described by way of example and in terms of the preferred embodiment, it is to be understood that the invention is not limited to the disclosed embodiment. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A centrifugal fan comprising:
a frame assembly including a plurality of stator blades; and
a blade structure, disposed in the frame assembly, including a plurality of first rotor blades and a plurality of second rotor blades;
wherein the frame assembly includes an air inlet and a wall inwardly extending from the air inlet to define an air-converging channel between an outer wall of the frame assembly and the wall.

2. The centrifugal fan as claimed in claim 1, wherein the frame assembly includes an air outlet, and the first rotor blades are located near the air inlet.

3. The centrifugal fan as claimed in claim 1, wherein the air-converging channel has an inlet therein, and the second rotor blades are located near the inlet.

4. The centrifugal fan as claimed in claim 3, wherein the blade structure includes a flange, extending toward the air-converging channel, near the inlet of the air-converging channel.

5. The centrifugal fan as claimed in claim 3, wherein the wall extends toward the inlet of the air-converging channel, to separate the air-converging channel and a channel for air passing through the stator blades, the first rotor blades and the second rotor blades.

6. The centrifugal fan as claimed in claim 5, wherein the height of the air-converging channel and the height of the channel for air passing through the stator blades and the first and second rotor blades are partially or completely overlapped in an axial direction of the blade structure.

7. The centrifugal fan as claimed in claim 3, wherein a cross-sectional area of the air-converging channel is substantially equal to a cross-sectional area of the air outlet.

8. The centrifugal fan as claimed in claim 2, wherein each of the first rotor blades includes an inclined surface near the air inlet.

9. The centrifugal fan as claimed in claim 1, wherein the frame assembly comprises:
a first frame for allowing the blade structure to be disposed therein; and
a second frame combined with the first frame, wherein the stator blades are formed on the second frame.

10. The centrifugal fan as claimed in claim 1, wherein the blade structure comprises:
a first portion with the first rotor blades; and
a second portion, combined with the first portion, having the second rotor blades.

11. A centrifugal fan comprising:
a first frame;
a second frame including at least one set of stator blade, an air inlet and a wall inwardly extending from the air inlet to form an air-converging channel between the first frame and the second frame;
a driving device disposed on the first frame; and
a blade structure with a first portion combined with the driving device and including a plurality of first rotor blades, and a second portion combined with the first portion and including a plurality of second rotor blades, wherein the stator blades are located between the first rotor blades and the second rotor blades.

12. A centrifugal fan comprising:
a frame including a plurality of stator blades and an inwardly extending wall to define an air-converging channel with an inlet in the frame; and
a blade structure disposed in the frame and including a flange and a plurality of rotor blades, wherein the flange extends toward the air-converging channel and is located near the inlet.

13. A centrifugal fan comprising:
a frame including a plurality of stator blades, for increasing air pressure, an inwardly extending wall to define a first channel for gathering airflow and a second channel for air passing through; and
a blade structure disposed in the frame and including a plurality of rotor blades, wherein the height of the first channel and the height of the second channel are partially or completely overlapped in an axial direction of the blade structure.

14. A heat-dissipating device comprising:
a frame structure including at least one set of stator blades, for increasing air pressure, and an air-converging channel having an inlet; and
a blade structure, disposed in the frame structure, including at least one set of rotor blades;
wherein the frame structure further comprises:
a first frame for allowing the blade structure to be disposed therein; and
a second frame combined with the first frame, wherein the stator blades are formed on the second frame.

15. The heat-dissipating device as claimed in claim 14, wherein the stator blades and the rotor blades are arranged in a staggered manner.

16. The heat-dissipating device as claimed in claim 14, wherein the frame structure is formed with an inwardly extending wall, extending toward the inlet, to form the air-converging channel and a channel for air passing through the stator blades and the rotor blades.

17. The heat-dissipating device as claimed in claim 14, wherein the second frame is formed with a wall, extending toward the inlet, to form the air-converging channel and a channel for air passing through the stator blades and the rotor blades.

18. The heat-dissipating device as claimed in claim 17, wherein the height of the air-converging channel and the height of the channel for air passing through the stator blades and the rotor blades are partially or completely overlapped in an axial direction of the blade structure.

19. The heat-dissipating device as claimed in claim 14, wherein the at least one set of stator blades are disposed on an air inlet of the frame structure or an air outlet of the frame structure.

20. The heat-dissipating device as claimed in claim 14, wherein each of the rotor blades includes an inclined surface near an air inlet of the frame structure.

21. The heat-dissipating device as claimed in claim 14, wherein a cross-sectional area of the air-converging channel is substantially equal to a cross-sectional area of an air outlet of the frame structure.

* * * * *